Nov. 7, 1961 D. A. JONES 3,007,356
ADJUSTABLE BORING BAR
Filed Oct. 30, 1958 2 Sheets-Sheet 1

DERRICK A. JONES
INVENTOR,

BY Homer L. Montague
ATTORNEY

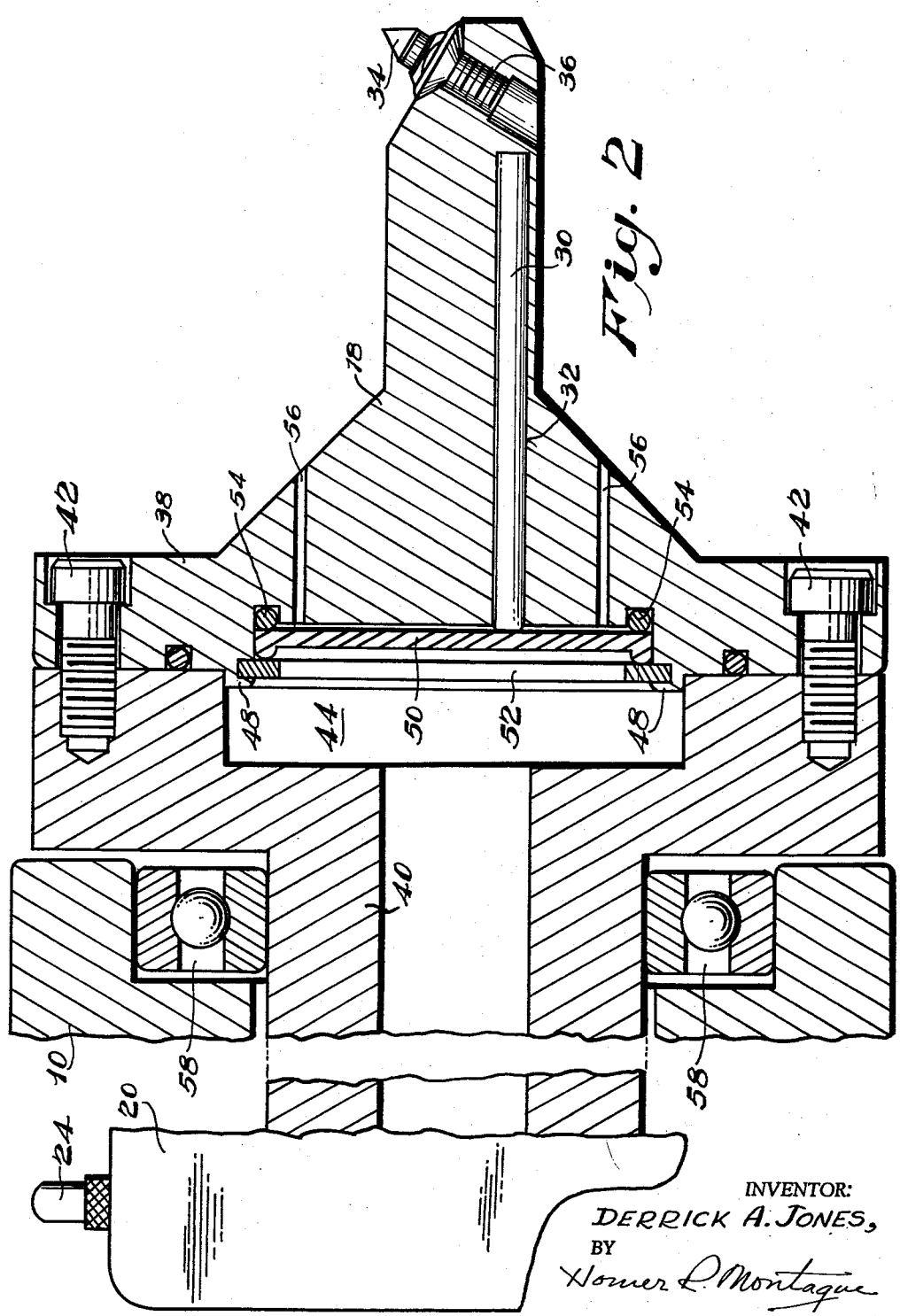

United States Patent Office 3,007,356
Patented Nov. 7, 1961

3,007,356
ADJUSTABLE BORING BAR
Derrick A. Jones, Halesite, N.Y., assignor to Fairchild Camera and Instrument Corporation, a corporation of Delaware
Filed Oct. 30, 1958, Ser. No. 770,737
4 Claims. (Cl. 77—58)

This invention pertains generally to adjustable boring bars for boring machines and the like, and more particularly to boring bars which may be adjusted as to depth of cut in very small increments and without the necessity of even partial disassembly of the boring bar or the removal thereof from the boring machine.

In the past it has been customary in the use of boring machines and other similar machine tools to maintain a watch over the dimensions of the work being machined, and when it is noticed that one or more of the dimensions are beyond the tolerance set for the particular work piece, the machine must be shut down with the boring bar removed from the work so that the operator of the machine may make a mechanical adjustment to the radial displacement of the boring bit. Such mechanical adjustment has usually necessitated the unclamping of one or more holding members, the adjustment of the position of the bit with respect to the bar, and the subsequent re-clamping of the holding members. Event where the operator is successful in adjusting the setting of the bit to within a sufficiently small tolerance, a rather difficult assignment in itself in view of the ever-decreasing tolerances allowable in the type of precision work which is becoming commonplace at present, it often happens that the act of re-clamping of the boring bit actually destroys the precise setting thereof that had just been made.

It is accordingly a primary object of the present invention to provide an adjustable boring bar or the like which may be adjusted as to depth of cut without being removed from the machine tool with which it is associated.

Another object of the invention is to provide an adjustable boring bar or the like which may be adjusted as to depth of cut without removal thereof from the workpiece.

A further object of this invention is to provide an adjustable boring bar or the like which may be adjusted as to depth of cut without necessitating interruption of the machining of the workpiece or the removal of the boring bar therefrom.

In accordance with the present invention, the above and other objects are achieved by means of a boring bar or the like having an elongate hole therein parallel to but spaced from the central axis of rotation thereof, with a rod of substantially non-compressible material inserted therein. The end of the elongate hole near the bit mounted on the boring bar is closed, and the rod inserted therein is of sufficient length to allow the end thereof remote from the bit to extend beyond the mounting face of the bar, protruding from the open end of the elongate hole at such mounting face. A plate or the like is positioned over the protruding end of the rod and generally parallel to the mounting face of the boring bar, and suitable means are provided for exerting a force of selectable amplitude on such plate in the axial direction of the boring bar. When the plate is urged toward the boring bar, the rod inserted within the bar is subjected to a force which causes non-symmetrical elongation of the bar due to the eccentric position of the rod. As that radial section of the bar within which the rod is inserted is thus elongated with respect to the remaining portion, the bar undergoes a bending action transverse to the axis of rotation thereof, and the position of the bit is thereby adjusted for a desired depth of cut. Means are provided for controlling the amount of force applied to the plate which bears against the protruding end of the rod, so that the adjustment of the depth of cut may be made manually or, if desired, in accordance with the output of suitable automatic work-gauging means well known to those skilled in the art.

With the above considerations and objects in mind, the invention itself will now be described in connection with a preferred embodiment thereof given by way of example and not of limitation, and with reference to the accompanying drawings, in which:

FIG. 2 is an enlarged view of those portions of the apparatus of FIG. 1 essential to the present invention, the major portion of the figure being in vertical section.

Figure 1:
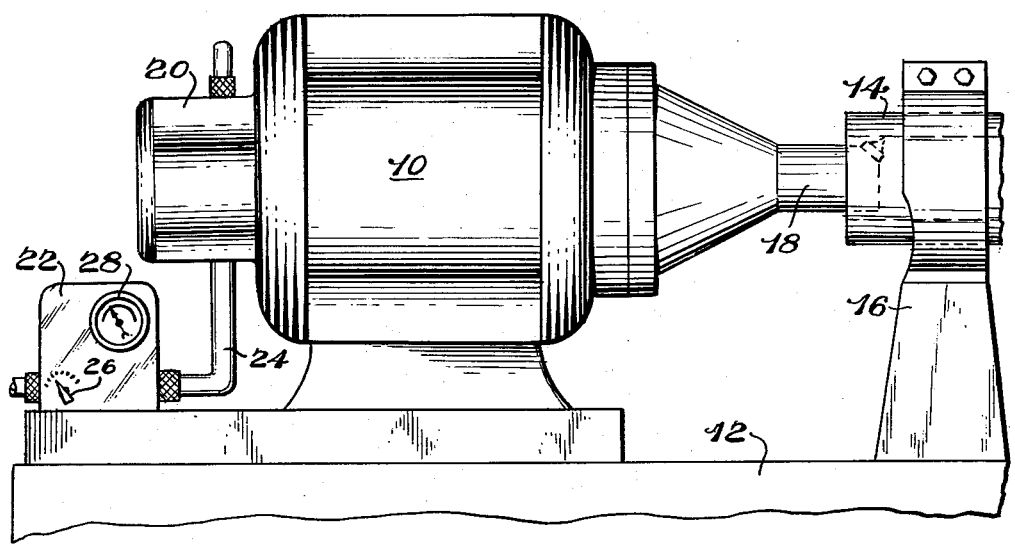
FIG. 1 is a front elevation of a typical boring machine employing the present invention.

Referring now to FIG. 1, there is shown a main housing 10 of a typical boring machine or the like, mounted for sliding movement by means not shown on a suitable bed 12 in a direction toward or away from a workpiece 14, the latter being held against movement by means of a workholder 16 which may be mounted in any suitable manner. Rotary driving means such as an electrical motor or the like are provided within housing 10 for causing rotation of a central drive shaft (not shown in FIG. 1) to which the boring bar 18 is attached. At the end of this central shaft remote from boring bar 18 there is a rotary fluid-tight joint 20 by means of which fluid pressure may be applied to a portion of boring bar 18 as will be further described in connection with FIG. 2. In order to control the amplitude of the pressure applied to the bar, a pressure regulator 22 is provided in the fluid pressure supply line 24, the latter being connected to a suitable source of fluid pressure not shown, which may be either pneumatic or hydraulic. Regulator 22 is provided with a pressure control knob 26 and a pressure indicator 28.

FIG. 2 discloses in more detail the nature of the present invention, wherein it is desired to achieve minute transverse adjustment of the free end of boring bar 18 by means of corresponding forces applied to a rod 30 in a direction generally parallel to the axis of rotation of bar 18. Rod 30 is of some substantially non-compressible material such as steel or the like, and is inserted within an elongate hole 32 situated parallel to the axis of bar 18 but spaced therefrom. As may be seen in the drawing, the end of aperture 32 near the free end of bar 18 is closed, and the length of rod 30 is such that when one end thereof is pressed against the closed end of hole 32, the other end protrudes slightly beyond the other, open end of the hole. A boring bit 34 is mounted on bar 18 in a manner well known to those skilled in the art, so as to permit gross adjustment of the depth of cut as determined by the radial distance of the tip of the bit 34 from the axis of rotation of the bar 18. The mounting for the bit usually includes threaded means, as indicated generally at 36, which may be adjusted and then locked or clamped into place at a desired setting.

At the end of bar 18 remote from the bit 34 the bar has an enlarged portion or flange 38 which serves as the mounting means for connection of the bar to the rotary drive shaft 40 of the machine tool. Threaded connectors 42 are provided for effecting this connection. A primary difference between the central shaft 40 of the machine tool shown and the corresponding drive shaft of most tools is that shaft 40 is hollow in order to permit fluid pressure connection between the annular chamber 44 in the bar-mounting face of the shaft and the fluid pressure supply line 24 through the fluid-tight rotary joint 20.

Facing the annular chamber 44 in the end of drive shaft 40 there is an annular recess in the mounting face of the bar 18, the recess having a peripheral lip 48. A plate 50 is positioned within this recess with one surface thereof bearing against the protruding end of rod 30, the plate being held in position by means of a retaining ring 52 which is adapted to snap into a peripheral groove in the recess. An annular sealing ring 54 is provided within the recess to serve both as a resilient cushion for the plate 50 and as a fluid seal to prevent the leakage of fluid from the central bore of drive shaft 40 through vents 56, the latter being provided to prevent the build-up of any back-pressure on the back or bar side of plate 50 when the plate is urged toward the right (as seen in FIG. 2) under control of the pressure in the bore of shaft 40. It will be understood that this shaft 40 is the rotary drive shaft referred to in general terms in connection with the description of FIG. 1, the shaft being provided with the usual friction-reducing bearings as at 58.

Figure 3:
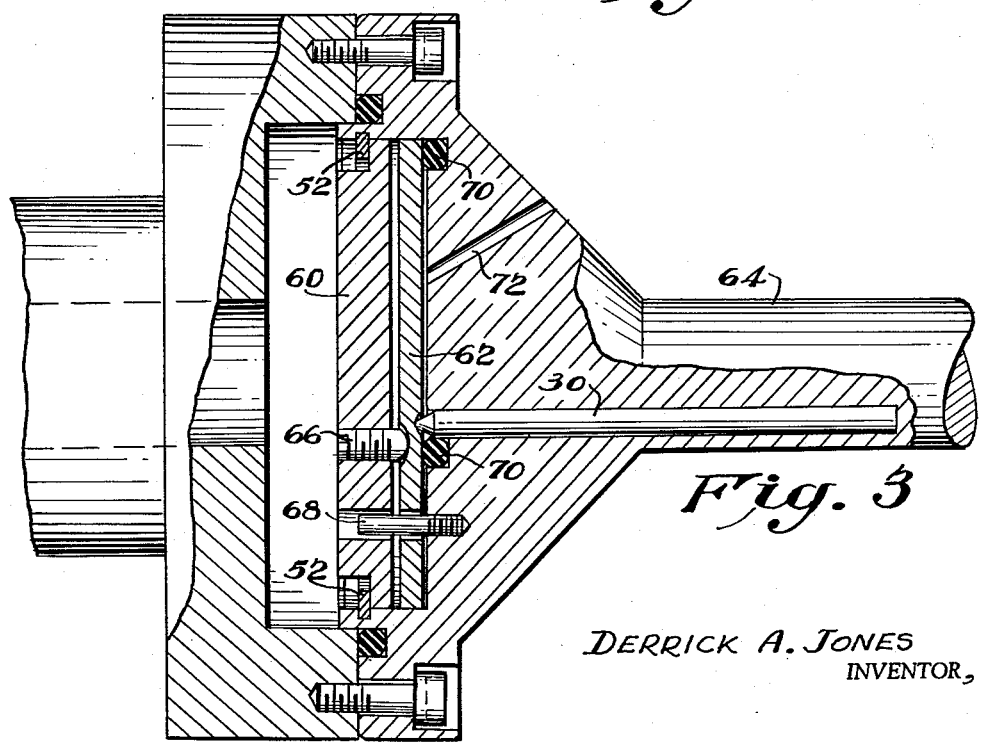
FIG. 3 is a vertical section of a modified form of the boring bar of the present invention.

A preferred form of the means for effecting the transverse adjustment of the free end of boring bar is shown in the modified form of FIG. 3, wherein elements which are identical to those of the previous figures bear corresponding reference numerals. In the apparatus of FIG. 3 a pair of plates 60 and 62 are provided within the recess in the mounting face of boring bar 64. Plate 60 is held in place by means of retaining ring 52, and the plate carries an adjustable set screw 66 or the like. As may be seen in the drawing, set screw 66, which serves as a pivot point for plate 62, is not in alignment with the rod 30, and the latter is parallel to but spaced from the axis of rotation of bar 64 as in the case of bar 18. Plate 62 is dimpled at two respective points to provide recesses for receiving the pointed ends of the set screw 66 and rod 30. A locating pin 68 is also provided for maintaining the desired relative rotational positions of the two plates 60 and 62 with respect to the mounting face of the boring bar 64. As may be seen, pin 68 is secured to bar 64, and it extends through the two plates, fittingly loosely in respective apertures therein. The sealing gasket 70 of FIG. 3 is eccentrically disposed with respect to the axis of rotation of bar 64, since the action in this form of the invention involves the pivoting of the plate 62 as opposed to the linear displacement of the plate 50 in the form shown in FIG. 2.

Referring now to the operation of the apparatus of the invention, and referring first to the form shown in FIG. 2, as fluid pressure is admitted to the rotary joint 20 under the control of the regulator 22, the pressure is transmitted through the central bore of the drive shaft 40 into the annular chamber 44. Since there is no means for escape of the fluid from this chamber, the pressure is applied to plate 50, and the latter is thereby urged toward the right (as seen in FIG. 2). This translation of the plate 50 places a force on the protruding end of rod 30, and the latter is thereby driven to the right against the closed end of the aperture in which it is inserted. Since the rod is made of a substantially non-compressible material, the radial section or segment which includes the rod 30 will undergo a lengthening with respect to the remaining portions of the bar 18. The differential lengthening is the result of the eccentric positioning of the rod 30. As a result of the elongation of the lower portions (as seen in FIG. 2) of boring bar 18, the bar is caused to bend upwardly, with the distance between the tip of bit 34 and the axis of rotation of the bar thereby being increased. It has been found that a linear relationship exists between the amplitude of the pressure applied and the amount of transverse motion of the free end of the boring bar 18, whereby the depth of cut of the bit 34 may accurately be controlled by varying the amount of fluid pressure applied, and in a predictable and reproducible manner.

With respect to the operation of the form of the apparatus shown in FIG. 3, much the same action takes place, except that the apparatus of FIG. 3 provides a degree of force multiplication by means of the lever arm existent in plate 62. As the fluid pressure is applied to plate 62 through the aperture in which the locating pin fits or through some other suitable aperture, the plate is pivoted away from its normal plane by virtue of the fact that the lower portion of the plate is subjected to equal pressure on both its faces, while the full fluid pressure is effective against only that portion of plate 62 which has the back or bar side free, such area being defined by the off-center sealing ring 70. This area, or rather the volume defined by this area, has a vent 72 for relief of the pressure built up therein when the upper portion of plate 62 is pivoted toward the mounting face of bar 64. FIG. 3 actually shows plate 62 slightly pivoted clockwise by the pressure applied to its face on the side opposite vent 72, so that the lower part of plate 62 is now out of contact with the face of bar 64.

The invention has been described above in some detail, and particularly with reference to its application to a boring machine or the like. However, it will be apparent to those skilled in the art that the invention is equally applicable to other machine tools of analogous nature, wherein it is desired to effect adjustment of the depth of cut without removing the cutter from the work or, and what is an even greater advantage, without even partially disassembling the cutter apparatus. Also, it will be apparent that the depth of cut may be effected in accordance with a manual setting of the control mechanism which regulates the amplitude of the fluid pressure applied to the movable plate or plates of the boring bar, or may equally well be carried out in response to the output of any suitable automatic gauging means which may measure the size of the workpiece either just after it is produced or, and sometimes more preferably, while the cut is actually being made in order to exercise the closest control possible of the dimensions of the finished piece. Hence, the invention is not to be considered as limited to the particular details given, nor to the specific application to which reference has been made during the description of the apparatus, except insofar as may be required by the scope of the appended claims.

What is claimed is:

1. In a boring machine or the like, an adjustable boring bar assembly comprising an elongate boring bar having a central axis of rotation, means for securing a boring bit to one end of said bar, means at the other end of said bar for securing said bar to a rotary drive member of such machine, an elongate hole in said bar substantially parallel to said axis but spaced therefrom, the end of said hole nearer said one end of said bar being closed, the other end of said hole being open, an elongate rod positioned within said hole with one end thereof in abutting relation with said closed end of said hole, and means including a pressure-responsive drive element carried by said bar for applying a selectable amplitude of axially directed mechanical force to the other end of said rod in order to cause a controlled displacement of said one end of said bar in a direction substantially transverse of said axis.

2. In a boring machine or the like, an adjustable boring bar assembly comprising an elongate boring bar having a central axis of rotation, means for securing a boring bit to one end of said bar, means at the other end of said bar for securing said bar to a rotary drive member of such machine, an elongate hole in said bar substantially parallel to said axis but spaced therefrom, the end of said hole nearer said one end of said bar being closed, the other end of said hole being open and communicating with a recess in said other end of said bar, an elongate rod positioned within said hole with one end thereof in abutting relation with said closed end of said hole, a pressure plate carried by said bar and positioned in said recess with one face thereof abutting the other end of said rod, and means for applying a fluid pressure of selectable amplitude to the other face of said plate to urge said plate against said rod in a direction substantially parallel to said axis, whereby said one end of said bar is controllably displaced in a direction substantially transverse of said axis.

3. In a boring machine having a boring bit and boring bar assembly in which the incremental radial movement of the boring bit to cut into a work piece is accomplished by bending said boring bar assembly, the combination comprising, an elongate boring bar having a central axis of rotation, means for securing said boring bit to one end of said bar, means at the other end of said bar for securing said bar to a rotary drive member of such machine, an elongate hole in said bar extending the majority of the length of said bar and substantially parallel to the longitudinal axis of said bar but spaced therefrom, the end of said hole nearer said one end of said bar being closed, the other end of said hole being open and communicating with a recess in said other end of said bar, an elongate rod within said hole with one end thereof in abutting relation with said closed end of said hole, a pressure plate carried by said bar and positioned in said recess with one face thereof abutting the other end of said rod, and means for applying fluid pressure of selectable amplitude to the other face of said plate to urge said plate against said rod in a direction substantially parallel to said axis, whereby said one end of said bar is controllably displaced by bending in a direction substantially transverse of the longitudinal axis of said bar.

4. The apparatus as set forth in claim 3, in which the means for applying fluid pressure includes a pressure responsive device for indicating the incremental radial movement of the boring bar when fluid pressure is applied to the plate.

References Cited in the file of this patent

UNITED STATES PATENTS

| 2,237,692 | Stewart | Apr. 8, 1941 |
| 2,412,038 | Freisen | Dec. 3, 1946 |
| 2,626,534 | Arms et al. | Jan. 27, 1953 |
| 2,916,951 | Carlson | Dec. 15, 1959 |